March 10, 1942.   E. OKLEJAS   2,275,799
SELF-UNLOADING TRAILER
Filed April 3, 1941   6 Sheets-Sheet 5
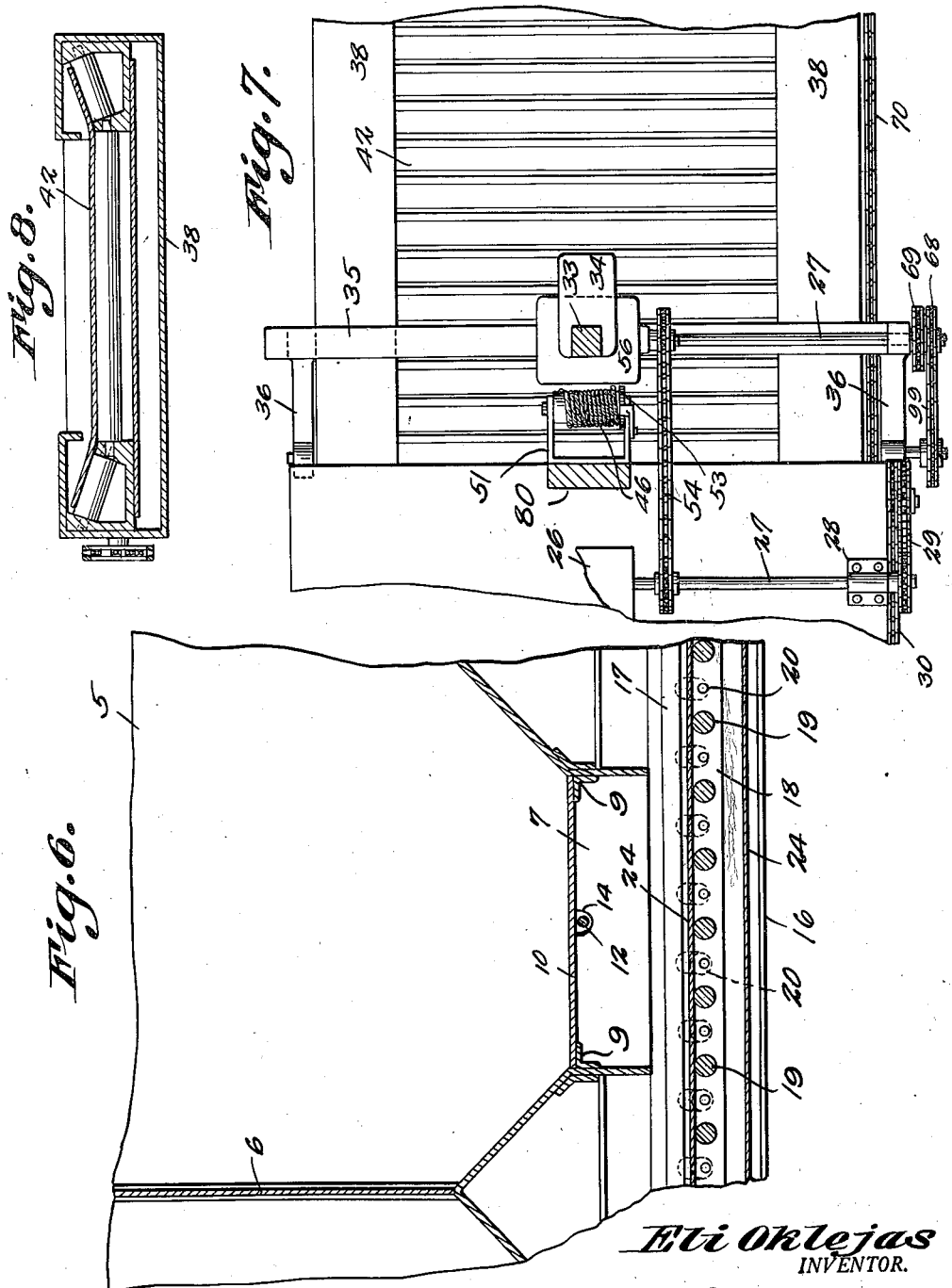
Eli Oklejas
INVENTOR.
BY
ATTORNEYS.

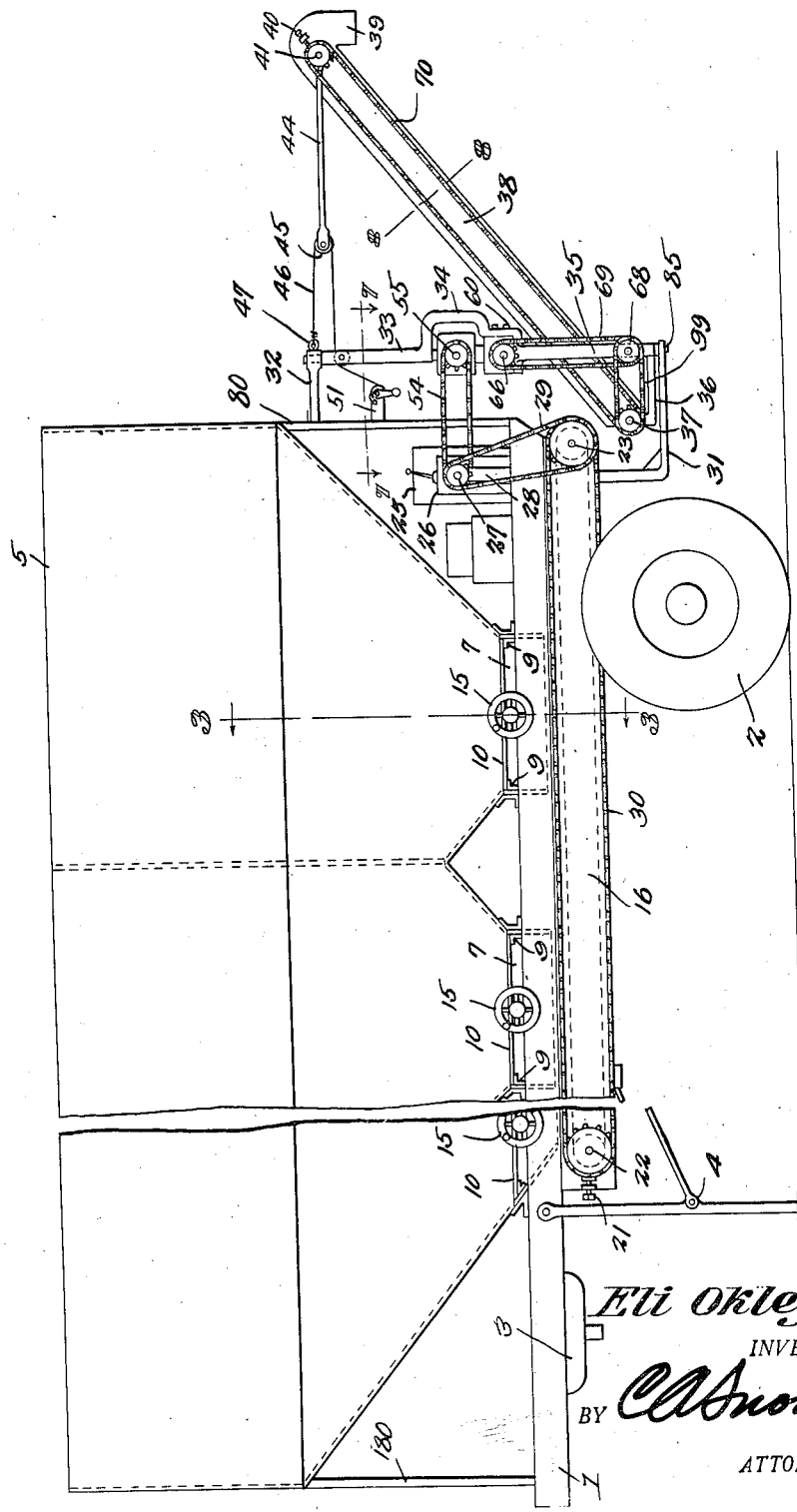

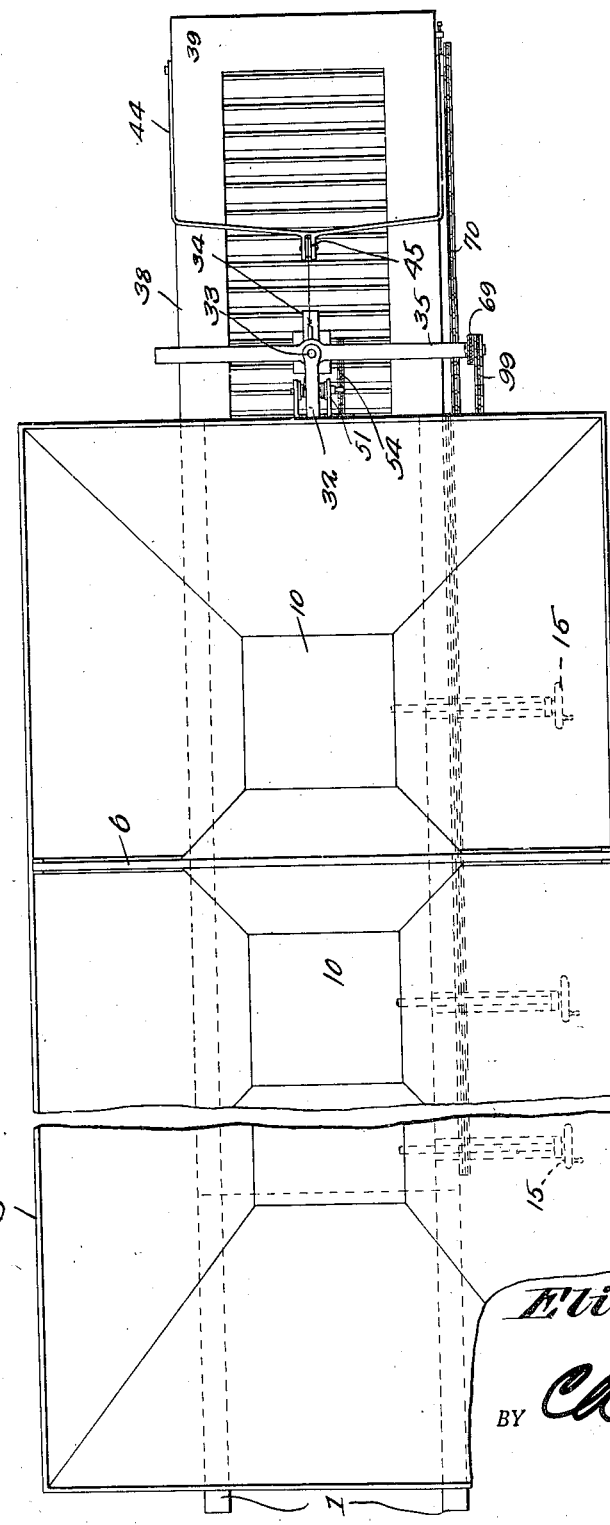

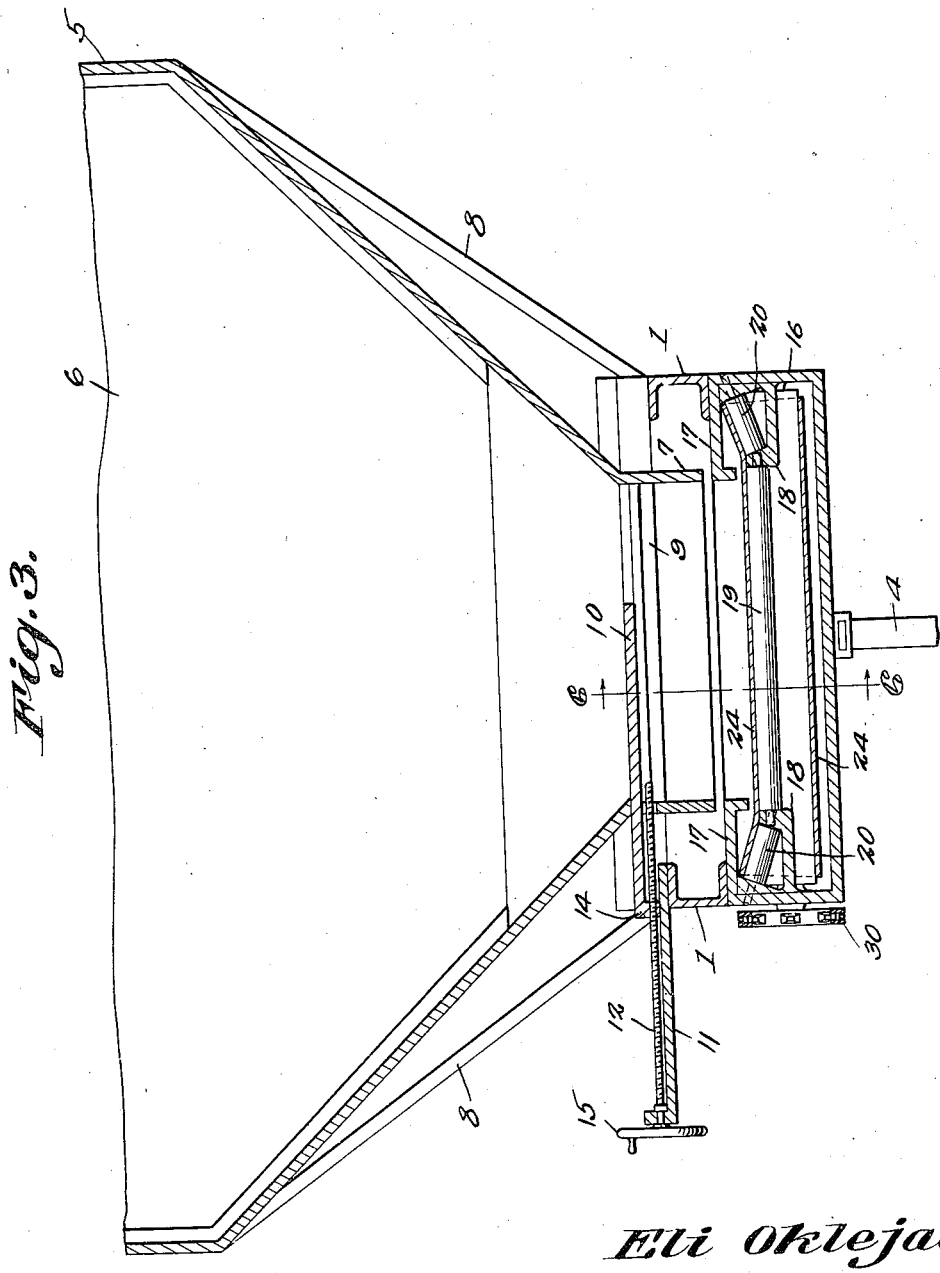

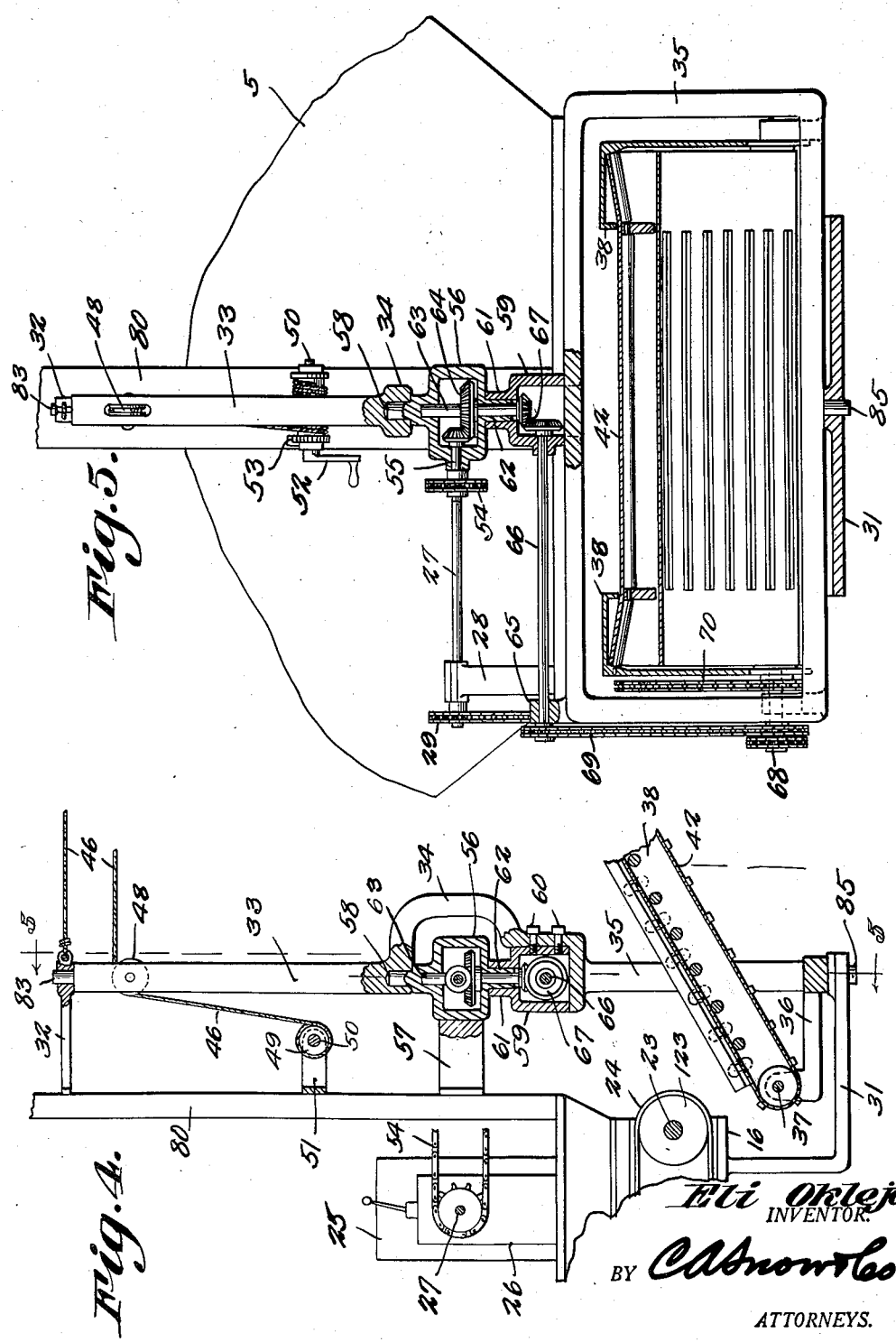

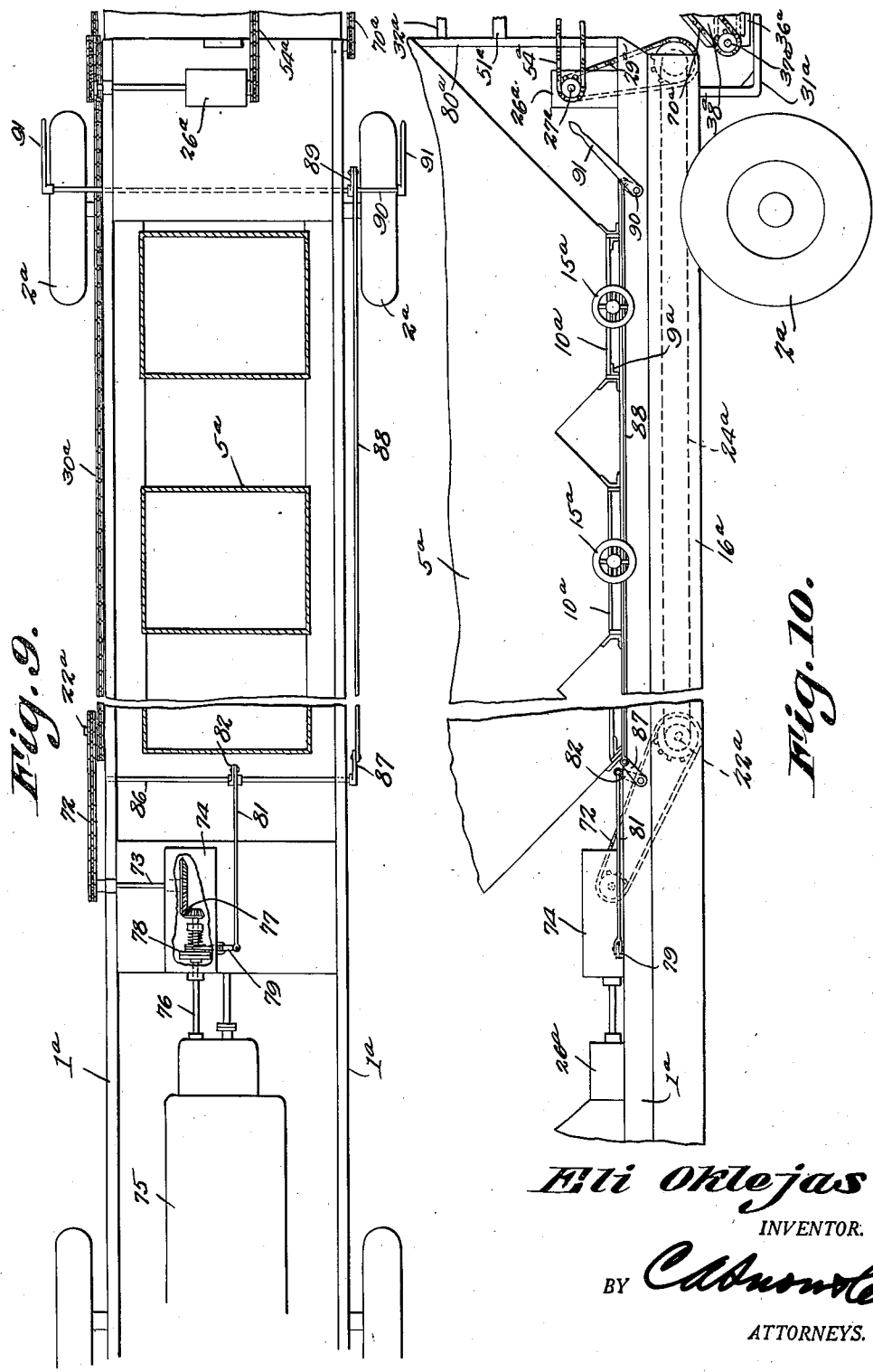

Patented Mar. 10, 1942

2,275,799

UNITED STATES PATENT OFFICE 2,275,799

SELF-UNLOADING TRAILER

Eli Oklejas, Monroe, Mich.

Application April 3, 1941, Serial No. 386,731

2 Claims. (Cl. 214—83)

This invention aims to provide novel means for unloading material from a trailer or truck, and especially, to supply novel means for imparting motion to an upwardly inclined and rearwardly extended auxiliary conveyer, which is mounted for lateral swinging adjustment and for vertical swinging adjustment.

A further object of the invention is to provide novel means for operating, in consonance with the auxiliary conveyer, a main conveyer which delivers material to the auxiliary conveyer.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a device constructed in accordance with the invention, embodied in a trailer, parts being broken away;

Fig. 2 is a top plan, wherein parts are broken away;

Fig. 3 is a cross section on the line 3—3 of Fig. 1;

Fig. 4 is a side elevation showing the means for mounting and controlling the auxiliary conveyer, parts being sectioned away;

Fig. 5 is a section on the line 5—5 of Fig. 4;

Fig. 6 is a section on the line 6—6 of Fig. 3;

Fig. 7 is a section on the line 7—7 of Fig. 1;

Fig. 8 is a section on the line 8—8 of Fig. 1;

Fig. 9 is a top plan showing a slightly modified form of the invention;

Fig. 10 is a side elevation of the structure depicted in Fig. 9.

In Figs. 1 to 8 of the drawings, there is shown a trailer, comprising a frame 1. Rear ground wheels appear at 2. The numeral 3 marks any appropriate or conventional means whereby the trailer may be connected to a towing vehicle (not shown). When the trailer is not in use, it is supported at its forward end by any suitable prop structure 4, appearing in Fig. 1.

On the frame 1 of the trailer are mounted any desired number of bins 5, located one behind the other. Movable division plates 6 are employed, to separate the bins into as many compartments as may be considered expedient. The bins 5 are provided, as shown in Fig. 3, for example, with reduced, depending outlet spouts 7, the bins being sustained from the frame 1 by side braces 8 and by end braces 80 and 180.

Figures 3 and 6 show that transverse guides 9 are located in the spouts 7 of the bins 5, gates 10 being mounted for horizontal reciprocation on the guides 9. It appears in Fig. 3 that the frame 1, at one side, is supplied with laterally outstanding brackets 11, screws 12 being held against longitudinal movement, but for rotation, in the brackets. The screws 12 are threaded into depending lugs 14 on the gates 10. Hand wheels 15 on the outer ends of the screws 12 constitute a convenient means for rotating the screws, to advance and retract the gates 10.

A box-like conveyer frame 16 (Figs. 1 and 3) extends lengthwise of the trailer, the conveyer frame being disposed below the main frame 1 of the vehicle, and being secured thereto. The conveyer frame 16 has inwardly projecting upper flanges 17, and inwardly projecting intermediate flanges 18, the flanges 18 being located between the bottom of the conveyer frame and the flanges 17. Horizontal main rollers 19 are located between the flanges 18 (Fig. 3) and are supported for rotation at their ends in those flanges. Supplementary rollers 20 are disposed at the ends of each main roller 19, and have an upward slant, the supplementary rollers being supported for rotation in the intermediate flanges 18 and in the side walls of the conveyer frame 16.

At its sides and near its forward end, the conveyer frame 16 carries belt tighteners 21, which are shown in Fig. 1. In the belt tighteners 21, a shaft 22 is mounted for rotation. A shaft 23 is journaled in the rear end of the conveyer frame 16. The shafts 22 and 23 carry rollers 123 (Fig. 4). A main belt conveyer 24 is engaged about the rollers 123 of the shafts 22—23 the upper run of the belt conveyer traversing the rollers 19 and 20 of Fig. 3. The rollers 20 dish the belt conveyer 24 crosswise, that it may better carry the material discharged upon it from the spouts 7 of the bins 5.

As to the means for actuating the main conveyer 24, a prime mover 25, for example a small internal combustion engine, is mounted on the rear part of the main frame 1. The engine 25 is coupled in the conventional way to a speed change mechanism 26, under the control of an operator and carried by the frame 1 (Fig. 1). The speed change mechanism 26 includes a laterally projecting shaft 27 (Figs. 5 and 7). The shaft 27 is supported for rotation in a bearing 28 carried by the main frame. A chain and sprocket drive 29 connects the shaft 27 with the driving shaft 23 for the main conveyer 24, the shaft 23 being coupled to the shaft 22 by means of a chain and sprocket drive 30.

Consulting Figs. 1, 4 and 5, it is shown that an angular foot bracket 31 is mounted on the rear end of the frame 16 for the main conveyer 24. The rear brace 80 carries a cooperating bracket 32. The numeral 33 marks a post supplied at its lower end with a transverse, rearwardly projecting offset 34. The lower end of the offset 34 is joined integrally to the upper rail of a loop-shaped foot or carrier 35 (Fig. 5), the foot being mounted at 85, intermediate its ends, to rotate in the bracket 31. The upper end of the post 33 is mounted at 83 to rotate in the bracket 32. Referring to Fig. 4, the bottom rail of the foot 35 carries a forwardly extended bearing member 36, wherein a transverse shaft 37 is journaled.

An auxiliary conveyer frame 38 is mounted at its forward end to swing vertically on the shaft 37 and extends rearwardly through the loop-shaped foot 35. At its rear end, the frame 37 has a depending spout 39. Noting Fig. 8, it will be seen that the auxiliary frame 38, in cross section, is constructed like the main conveyer frame 16 of Fig. 3. It seems unnecessary, in view of the clarity of the drawings, to trace out the common structural features of the frames 16 and 38.

Near its rear end, the conveyer frame 38 is provided with belt tighteners 40 (Fig. 1), a transverse shaft 41 being journaled in the belt tighteners. The shafts 37 and 41 carry an auxiliary belt conveyer 42, constructed in general like the main conveyer 24. The main conveyer 24 (Fig. 4) discharges on the auxiliary conveyer 42.

The means for swinging the auxiliary belt conveyer frame 38 upwardly and downwardly, at the will of an operator, includes a bail 44 (Fig. 2), having its side arms pivotally assembled with the auxiliary conveyer frame 38, and, if desired, the pivoting means may be the shaft 41. In its intermediate forward portion, the bail 44 carries a sheave 45, about which is rove a flexible element 46. One end of the flexible element 46 is anchored at 47 to the bracket 32 on the brace 80. The lower run of the flexible element 46 is rove over a sheave 48, mounted to turn in the post 33. From the sheave 48, the flexible element 46 proceeds downwardly, and is wound about a winch drum 49, the shaft 50 of the drum being mounted to rotate in a rearwardly projecting yoke 51 on the brace 80. The winch shaft 50 is rotated by means of a crank 52 (Fig. 5), retrograde rotation of the winch drum 49 being prevented by a pawl and ratchet mechanism 53.

The auxiliary conveyer frame 38 may be swung up and down, for adjustment, on the shaft 37. A lateral swinging movement of the frame 38 requires that the post 33 and its foot 35 be mounted for rotation with respect to a vertical axis. Since the engine 25 and associated parts are fixed, and do not participate in the aforesaid movements of the post 33 and the conveyer frame 38, a novel means is supplied for driving the auxiliary conveyer 42 from the engine.

From the shaft 27 of the speed change mechanism 26 (Fig. 1), a chain and sprocket drive 54 (Fig. 1) imparts rotation to a short horizontal shaft 55 (Fig. 5) which is mounted to turn in a box-like gear casing 56. The gear casing 56 is held fixed, because, as shown in Fig. 4, it is joined to the brace 80 by a connection 57. At its upper end, the gear casing 56 has a stub shaft 58, on which the lower end of the post 33 is rotatable.

A second or lower gear casing 59 is seated in the lower part of the post offset 34, and is secured thereto as indicated at 60. The second gear casing 59 is equipped with an upstanding neck 61, journaled on a depending neck 62 on the lower part of the fixed upper gear casing 56. Recalling that the foot 35 is attached, by way of the offset 34, to the post 33, it will be seen that the foot 35 turns with the post about a vertical axis represented by the depending neck 62 of the upper gear casing 56 and the lower pivot 85 of the foot.

In the upper part of the upper gear casing 56, and in the depending neck 62 of the gear casing, a vertical shaft 63 is journaled. The shaft 63 derives rotation from the shaft 55 by way of intermeshing beveled gears 64, located in the gear casing 56. On one upper corner of the foot 35 there is a bearing 65. A shaft 66, disposed parallel to the shaft 27, is journaled in the bearing 65 and in the lower gear casing 59. The shafts 63 and 66 are operatively connected by intermeshing beveled gears 67.

In one lower corner of the foot 35 (Figs. 5 and 1), a shaft 68 is journaled. The shaft 68 derives motion from the shaft 66 by way of a chain and sprocket connection 69. The shaft 68 is operatively connected with the shaft 37, on which the auxiliary conveyer frame 38 may be swung vertically, by a chain and sprocket connection 99. The shafts 37 and 41, which carry the auxiliary conveyer 42, are operatively connected by a chain and sprocket drive 70.

The actuating train for the main, horizontal conveyer 24 in the conveyer frame 16 includes the engine 25, the speed change mechanism 26, the shaft 27 of the speed change mechanism (Fig. 5), the chain and sprocket drive 29 (Fig. 1), the chain and sprocket mechanism 30, and the shafts 22 and 23. The driving train for the auxiliary conveyer 42 in the frame 39 includes the engine 25, the speed change mechanism 26, the shaft 27 of that mechanism, the chain and sprocket drive 54, the shaft 55, the intermeshing beveled gears 64, the shaft 63, the intermeshing beveled gears 67, the shaft 66, the chain and sprocket drive 69, the chain and sprocket drive 99, and the chain and sprocket drive 70.

The auxiliary conveyer frame 38 may be swung laterally about a vertical axis represented in Fig. 4 by the pivot elements 83 and 85 of the post 33 and the foot 35, respectively.

The auxiliary frame 38 may be swung upwardly and downwardly, within the foot 35, by a mechanism including the winch drum 49, the flexible element 46, and the associated parts.

As to gross operation, the material in the bins 5 flows downwardly through the spouts 7 (Fig. 3), under the governance of the gates 10, and is received on the upper run of the horizontally moving main conveyer 24. The conveyer 24 (Fig. 4) discharges on the auxiliary conveyer 42 and material is carried upwardly and rearwardly in the conveyer frame 38, the material being discharged through the spout 39 of Fig. 1.

It is not necessary that the delivery structure be embodied in a trailer. Figures 9 and 10 show it incorporated in a truck. In Figs. 9 and 10, parts hereinbefore described have been designated by numerals already used, with the suffix a.

The shaft 22a at the forward end of the main conveyer 24a is connected by a chain and sprocket drive 72 to a transverse shaft 73, journaled on the truck frame 1a and in a gear casing 74 supported from the truck frame. The propelling engine for the truck is marked by the numeral 75 and operates a shaft 76, extended longitudinally of the truck frame. The propelling engine for the truck is marked by the numeral 75 and operates a shaft 76, extended longitudinally of the truck frame. The shaft 76 is disposed at right angles to the shaft 73, and is coupled to that shaft by intermeshing beveled gears 77 in the gear casing 74, a clutch 78 being interposed in the shaft 76. The clutch 78 is operated by a throw lever 79, fulcrumed intermediate its ends on a part of the truck frame 1a. The forward end of a link 81 is pivoted to the throw lever 79, the rear end of the link being pivoted to a crank arm 82 on the intermediate portion of a transverse shaft 86, mounted to rock on the truck frame 1a.

At one end, the shaft 86 is provided with a crank arm 87, to which is pivoted the forward end of a link 88, the rear end of the link being pivoted to a crank arm 89 on a transverse shaft 90, mounted to rock in the truck frame 1a, the shaft 90 being supplied at its ends with handles 91, so located that the operator can throw the clutch 78 in and out, and operate the speed change mechanism 26a, without changing his position.

The form shown in Figs. 9 and 10 presents no characteristic peculiarity, aside from the fact that power is derived from the engine 75, rather than from the engine 25 of Fig. 1.

What is claimed is:

1. Unloading mechanism comprising a vehicle, an upper gear casing secured to the vehicle, an upright post having its lower end mounted to rotate on the upper gear casing, the post having an offset spanning the upper gear casing, an open carrier having its upper end connected to the offset, a lower gear casing secured in the offset and mounted to rotate on the upper gear casing, a conveyer frame extended through the carrier, means for mounting the frame on the carrier for vertical swinging movement, a conveyer traversing the frame, and mechanism for operating the conveyer, said mechanism comprising gearing located in the gear casings.

2. Unloading mechanism comprising a vehicle, an upper gear casing secured to the vehicle, an upright post having its lower end mounted to rotate on the upper casing, the post having an offset spanning the upper casing, a loop-shaped foot having its upper end connected to the offset, a forwardly extended bearing member secured to the lower portion of the foot, a lower gear casing secured to the offset and mounted to rotate on the upper casing, a frame extended through the foot, means for mounting the frame on the forward portion of the bearing member for vertical swinging movement, a conveyer traversing the frame, an upright shaft disposed in axial alinement with the post and supported for rotation in both casings, a lateral shaft supported, for rotation in each casing, a bevelled gear connection between each lateral shaft and the upright shaft, the bevelled gear connections being located in the respective casings, means for operating one lateral shaft, and means for connecting the other lateral shaft with the conveyer to actuate the conveyer.

ELI OKLEJAS.